UNITED STATES PATENT OFFICE.

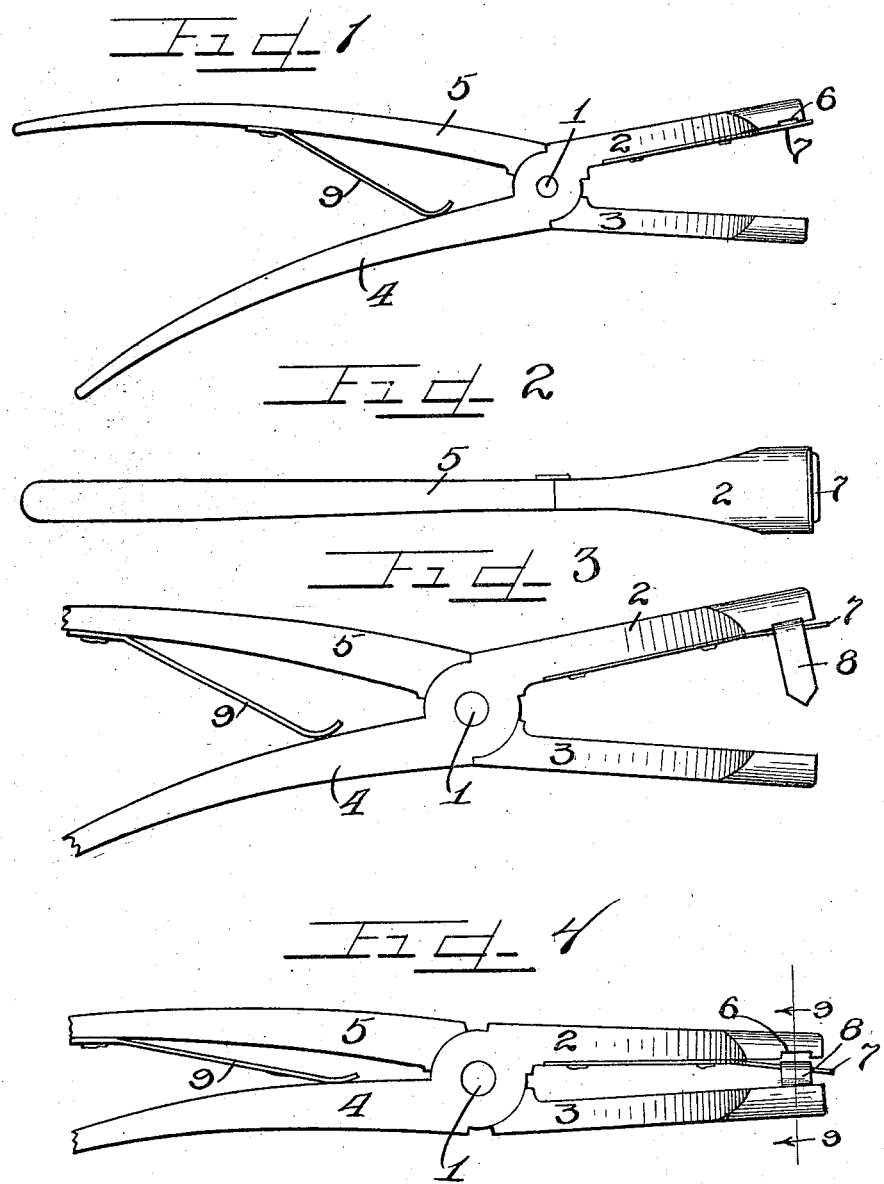

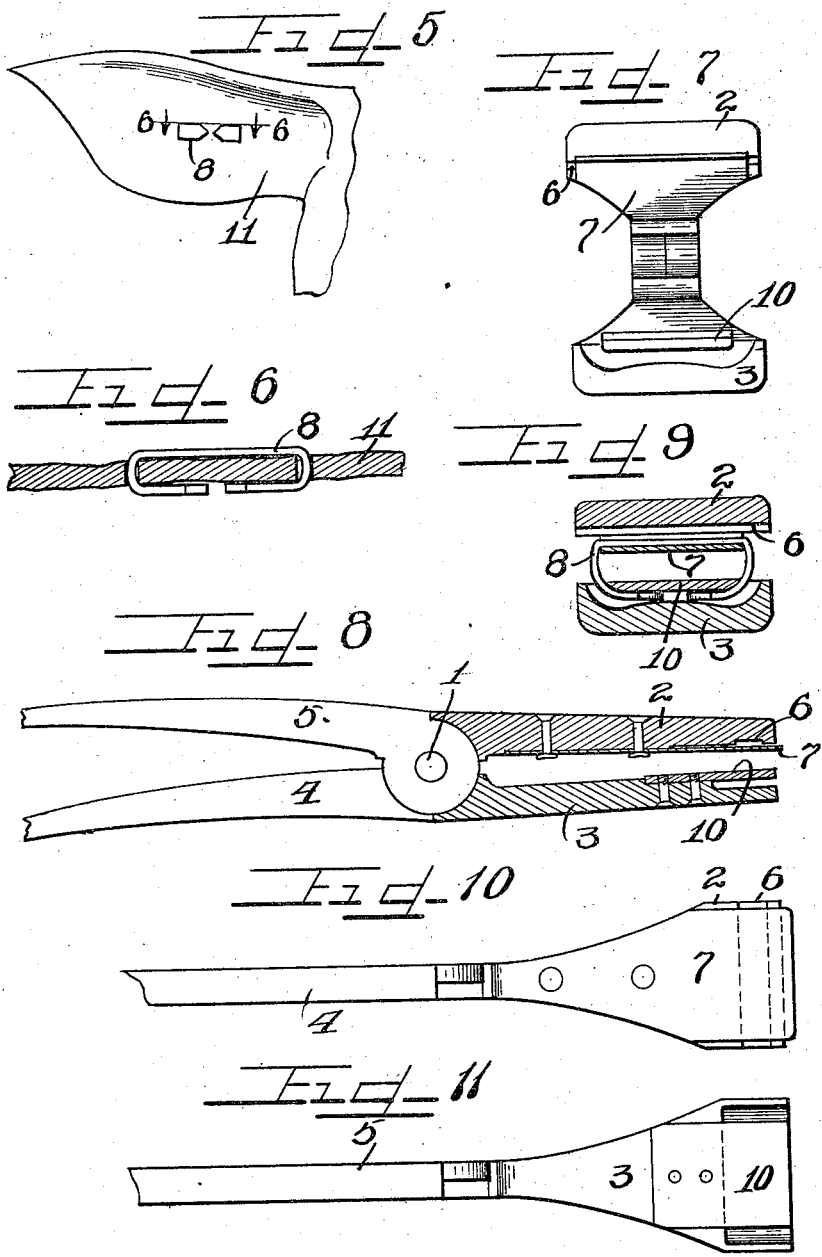

CHARLES E. TIMSON, OF CHICAGO, ILLINOIS, ASSIGNOR TO F. S. BURCH & CO., OF CHICAGO, ILLINOIS, A CORPORATION OF ILLINOIS.

TAG-ATTACHING TOOL.

1,188,510.  Specification of Letters Patent.  Patented June 27, 1916.

Application filed May 26, 1915. Serial No. 30,562.

*To all whom it may concern:*

Be it known that I, CHARLES E. TIMSON, a subject of the King of Great Britain, and a resident of the city of Chicago, in the county of Cook and State of Illinois, have invented certain new and useful Improvements in Tag-Attaching Tools; and I do hereby declare that the following is a full, clear, and exact description of the same, reference being had to the accompanying drawings, and to the numerals of reference marked thereon, which form a part of this specification.

This invention relates to a means of attaching identification tags to the ears of animals, not only involving a tag of improved construction, but also employing a tool of particular construction for the purpose, permitting the tag to be easily applied in a single operation by one person. Heretofore it has been customary to make incisions in the ear of an animal and then apply a tag therethrough by inserting a strip of metal or other suitable material through the incision in the ear and clamping the ends of the same together by a tool provided for the purpose, thus necessitating a multiplicity of operations. By this invention, however, the tag to be attached upon the ear of the animal is first associated with a tool for use as an element thereof in making the incision in the ear, and then folded snugly around the ear after being punched therethrough, so that upon slight release of the handle of the actuating tool the animal, jerking away, withdraws the ear with the tag attached thereon from the tool.

It is an object therefore of this invention to construct a device adapted to receive a tag strip associated therewith for utilization of the strip in punching slots through the ear of an animal for positive attachment of the tag thereto.

It is also an object of this invention to provide a device for the attachment of tags to the ears of animals embracing gripping jaws adapted to receive a tag inserted therein to force the pointed ends of the tag through the ear of an animal and fold said ends over snugly against the ear, permitting the attached tag to be then easily withdrawn from the tool.

It is also an object of this invention to construct a tool provided with resilient retaining means for a tag to hold the same in position while utilizing the tag as an element for punching the ear of an animal and acting further to fold the ends of the tag over to retain the tag upon the ear of the animal, and with means acting to open the jaws of the tool, permitting the same to be easily withdrawn from the tag and ear of the animal.

It is furthermore an object of this invention to construct a tool recessed to receive a tag engaged therein and provided with light resilient means for retaining the tag in position, and with guide channels for folding the ends of the tag inwardly toward one another when punched through the ear of an animal, permitting the tag to be withdrawn from said resilient means and endwise through said channels after attachment on the animal.

It is finally an object of this invention to construct a tool for attaching tags to the ears of animals, utilizing the tag as a punching element to make the incision in the ear of the animal and clamping the same thereon by a single operation.

The invention (in a preferred form) is illustrated in the drawings and hereinafter more fully described.

In the drawings: Figure 1 is a side view of a tool embodying the principles of my invention. Fig. 2 is a top plan view thereof. Fig. 3 is a side view of the tool, illustrating a tag associated therewith. Fig. 4 is a side view of the tool, showing the same partly released after clamping a tag to permit withdrawal of the tool from the tag attached to the ear of the animal. Fig. 5 is a detail fragmentary perspective view of the ear of an animal, showing the tag attached thereto. Fig. 6 is a detail section taken on line 6—6 of Fig. 5. Fig. 7 is an end view of the open jaws of the tool. Fig. 8 is a side view of the tool with the jaws in section. Fig. 9 is a detail section taken on line 9—9 of Fig. 4. Fig. 10 is an interior view of one of the members of the tool. Fig. 11 is a similar view of the other member of the tool.

As shown in the drawings: The reference numeral 1, indicates a pintle, upon which similarly constructed complemental members are mounted, affording jaws 2 and 3, respectively, and integral with each thereof are actuating handles denoted in each instance by the reference numerals 4 and 5, respectively. The jaw 2, is provided with a transverse groove or recess 6, near its outer end, and overlapping the same is a resilient member or leaf spring 7, secured by means of rivets on the inner surface of said jaw member, the jaw, as clearly shown in Fig. 8, being of less thickness near its outer end so as to form a relatively large surface beneath said resilient member spaced therefrom and out of contact therewith, so that said resilient member does not bear upon the surface of the jaw member on each side of the groove 6. Furthermore, said resilient member 7, projects beyond the end of said jaw 2, as clearly shown in the figures, and this is to permit easy insertion thereover of a tag 8, the ends of which are pointed and bent at right angles, and which, when slipped over the end of said resilient member 7, is pressed thereby into the groove 6, and thereby held securely associated with the jaw member. A relatively strong leaf spring 9, is secured to the handle member 5, and bears at its other end upon the handle member 4, and acts normally to impel said handle members away from one another to open the jaws, said spring 9, being a great deal stronger than the resilient member 7. As clearly shown the jaw member 3, is cored out, and recessed into the surface thereof and projecting to the end of said jaw member over the cored out portion thereof is a plate 10, which, by reason of its position and arrangement, affords a long slot or passage opening outwardly through the jaw member and at two points in the face thereof is adapted to receive the ends of the tag 8, in the manner shown in Fig. 9.

The operation is as follows: In order to tag an animal a tag 8, is inserted into the recess 6, beneath the resilient member 7, of the jaw 2, with the tool in the position shown in Fig. 1, so that the tag member assumes the position shown in Fig. 3, with respect to the tool. The tool with the tag member associated therewith is then inserted over the ear of an animal and actuated to drive the pointed ends of the tag member 8, through the ear of the animal, which is denoted by the reference numeral 11, and as the jaw members 2 and 3, approach one another the pointed ends of the tag member 8, driven through the ear of the animal, strike into the cored out portion of the jaw member 3, beneath the plate 10, and are turned inwardly in the manner shown in Figs. 5 and 6. Slight release of the hand of the operator upon the handles 4 and 5 permits the strong spring 9, to act to separate the jaw members, consequently pulling the light resilient member 7, outwardly from its jaw member 2, in the manner shown in Fig. 4, so that the animal, upon jerking away with the tag attached to the ear, pulls the tag from engagement with the members 7 and 10, of the tool. It is obvious, therefore, that preliminary incisions in the ear prior to the attachment of the tag thereto, are unnecessary, and the operation may be entirely performed by one person, whereas in the past it has required three or four perforations for the purpose. Furthermore, the tag being attached centrally through the ear and connected through two incisions made therein, there is less liability of the same tearing out by contact with foreign objects as in that type of tags which are inserted through one incision in the ear and clamped around the edge of the ear. Furthermore, the prong ends of the tag are folded inwardly on the inner surface of the ear, as shown in Fig. 5, and are thus protected from accidental entanglement with other objects, and the printing on the surface of the tag on the inner or outer side of the ear, is readily visible, not necessitating seizure of the same by hand and manipulation thereof in order to read the matter printed thereon.

I am aware that various details of construction may be varied through a wide range without departing from the principles of this invention, and I therefore do not purpose limiting the patent granted otherwise than necessitated by the prior art.

I claim as my invention:

1. In a tag attaching tool of the class described jaw members, one having a recessed portion in its working face, resilient means engaging over the recessed portion to retain a tag engaged therein, and a plate secured over a portion of the opposite jaw member and spaced therefrom to receive the ends of the tag engaged thereunder to fold the same inwardly and permit detachment of the tool from the tag secured upon the object after the clamping of said jaws to bend the ends of the tag inwardly.

2. In a tag attaching tool of the class described jaw members, one recessed to receive a tag inserted therein, resilient means retaining the tag in said jaw members, means acting normally to impel said jaw members apart, and one of said jaw members cored out to receive the ends of the tag projected thereinto when said jaw members are clamped toward one another to fold the tag around the object through which said tag has been inserted.

3. A tag attaching tool comprising pivotally connected jaw members, one thereof recessed to receive a tag engaged therewith, a resilient member secured on said jaw member extending over the recess therein to hold the tag engaged in said recess, and the other of said jaws having a cored out portion to receive the ends of the tag projected therein to fold the same inwardly when the jaws are closed toward one another, said resilient member then acting when the jaws are opened due to the draft of the tag therein to spring away and release the tag.

4. In a device of the class described a tool comprising jaw members, resilient means acting normally to impel the same into open position, one of said jaw members recessed, a resilient plate extending over said recess adapted to hold a tag secured in said recess, the other of said jaw members recessed to receive the ends of the tag projected thereinto when the jaw members are closed toward one another, a plate on said latter jaw member extending over the recess therein to receive the ends of the tag engaged therebeneath to retain the same detachably engaged therewith, and handles forming a part of said jaw members to actuate the same against the stress of said resilient means toward one another to fold the tag.

5. In a device of the class described pivotally connected jaw members, handles formed thereon, resilient means interposed between said handles to resist closure of said jaw members toward one another, one of said jaw members having a recess formed in the face thereof, a resilient member secured on said jaw members projecting over said recess adapted to retain a tag mounted in said recess, the other of said jaw members cored out to receive the ends of the tag projected thereinto to be bent over toward one another, and a plate secured upon said lower jaw member beneath which said ends of the tag are folded acting when said jaw members are opened to cause the tag to be disengaged from the recess in the other jaw member by springing the resilient member therefrom and said plate so disposed with reference to the recesses in said latter jaw member as to permit withdrawal of the tag from the end of the jaw member in the bent condition.

In testimony whereof I have hereunto subscribed my name in the presence of two subscribing witnesses.

CHARLES E. TIMSON.

Witnesses:
CHARLES W. HILLS, Jr.,
EARL M. HARDINE.